May 22, 1945.  F. WRIGHT  2,376,842
DRILL JIG
Filed June 26, 1943
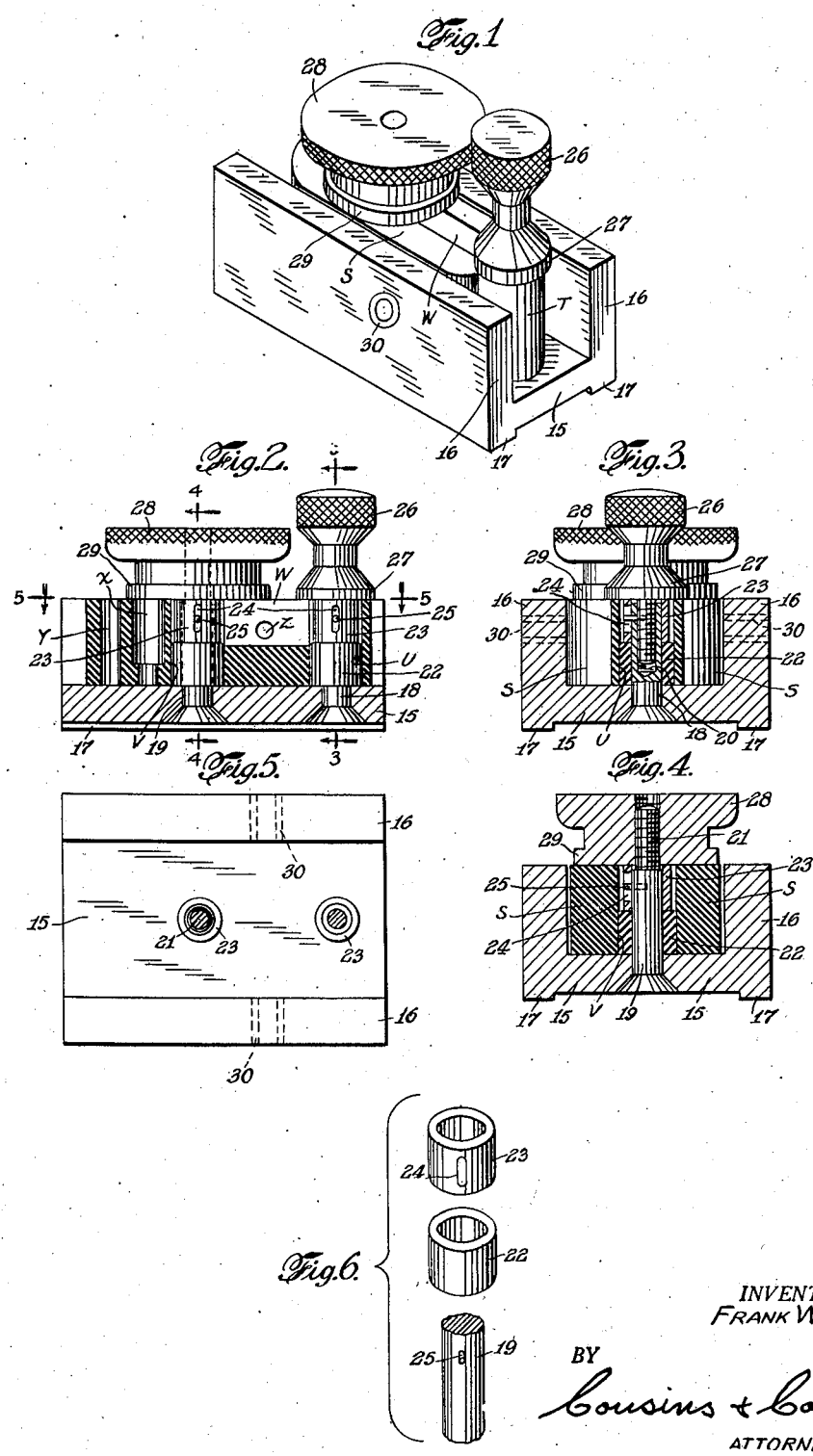
INVENTOR.
FRANK WRIGHT
BY
Cousins & Cousins
ATTORNEYS.

Patented May 22, 1945

2,376,842

UNITED STATES PATENT OFFICE 2,376,842

DRILL JIG

Frank Wright, East Orange, N. J., assignor to Breeze Corporations, Inc., Newark, N. J., a corporation of New Jersey Application June 26, 1943, Serial No. 492,657

2 Claims. (Cl. 77—62)

This invention relates to appliances and tools for holding work parts, while being subjected to mechanical operations, such as milling, grinding, and more particularly drilling, such devices being commonly called jigs.

The function of such apparatus is to locate a work part therein with reference to drill guiding bushings set permanently in the jig, the work being part adjustably positioned by openings in it, previously finished surfaces, etc., and then securely, but releasably, clamped within or on the jig.

In case the article to be drilled is supplied with one or more openings, such as are molded, cast or otherwise formed, and which may taper, present irregularities, or vary otherwise from being truly cylindrical, it is obvious they will not closely fit fixed circular locating studs in the jig.

If the work part openings loosely fit such studs, the centers of the holes to be drilled may vary in distance and location from that required inadmissibly.

It is an object of the invention to provide a jig, or similar appliance, for holding an article while being machined, as by drilling, with uniformly expansible locating means, enterable in one or more openings in the article, whereby the openings are positioned precisely concentric with the locating means, irrespective of inaccuracies in the openings.

A further feature is in the provision of a novel locating means for articles having substantially circular openings, whereby the article is automatically adjusted to aline the axes of the openings with the axes of the locating means, prior to clamping, and without possibility of damage to the article.

Another purpose is to produce a work-holding jig in which the locating means take up the thrust of the cutting tool, eliminates vibration and consequently chatter.

These and analogous objects are attained by the novel and practical construction, combination and arrangement of parts hereinafter fully described and shown in the annexed drawing, forming a material part of this disclosure, and in which:

Figure 1 is a perspective view of an embodiment of the invention illustrating its application.

Figure 2 is a sectional view taken through the longitudinal center of the device.

Figure 3 is a transverse sectional view looking on line 3—3 of Figure 2.

Figure 4 is a similar sectional view looking on line 4—4 of Figure 2.

Figure 5 is a top plan detail view of the jig body, looking on line 5—5 of Figure 2.

Figure 6 is a detail expanded view of one of the locating studs, collar and sleeve.

As shown in the drawing, a work part, generally indicated by the character S, having flat upper and lower faces and parallel flat sides, convexly curved at the ends, has a narrow curved extension T, in which is a circular hole U.

A similar hole V is formed through the body S, these holes being partially connected by a slot W; rearward of the holes is a counterbored opening X, while further out is a small opening Y.

This article is molded from some of the many phenolic substances and therefore the several holes are slightly tapering, yet it is required to drill a passage Z, at a right angle to the holes and exactly midway therebetween.

It is to be understood that the foregoing details are given only as an example of any article in which one or more holes exist and which are to be machined with respect to their axes; these holes may be polygonal, rough interiorly, tapered, or be otherwise than truly cylindrical, and of different sizes, therefore incapable of fitting straight locating posts or studs with a requisite degree of accuracy necessary to exactness in machine operations on the article.

The jig shown may be of an exceedingly simple character, consisting of a channel shaped structure composed of a base plate 15, having raised parallel sides 16 and preferably provided with feet 17.

Set rigidly in the base 15 are two locating studs 18 and 19, the stud 18 being axially drilled and tapped to produce a screw thread 20, in its upper portion, while the stud 19 has an extending threaded stem 21, these studs being very considerably less in diameter than the holes U and V, but positioned with precision at the points where the centers of holes should be.

A dilatable collar 22, such as rubber, normally smaller in diameter than the holes, and of uniform thickness, is disposed on each stud, and thereabove is a metallic sleeve 23, equivalent in diameter to the collar, slidable on the stud.

The sleeves are each provided with a slot 24, closed at its ends and engaging a pin 25 set in the stud, to limit their movement.

A knurled thumb screw 26 having an enlarged body 27 is fitted to engage the threads of the stud 18, and a knurled thumb nut 28 having a flange 29 is fitted to the stem 21.

One or more hardened steel bushings 30 are accurately positioned in the sides 16 of the jig, exactly midway the axes of the studs 18 and 19, and at such height or distance from the base as may be required.

While the expansible element 22 has been described as rubber, it is obvious that suitable equivalent expansible means may be substituted. It is found in practice that "neoprene," which is resistant to the effect of oil and grease used to lubricate the cutting tool, is satisfactory.

The collar 22 is preferably composed of homogeneous material in order to insure uniform expansion thereof.

In operation, the article to be drilled is loosely disposed on the floor of the base 15, the studs, with their expansible collars and sleeves freely entering the holes in the article.

Thereafter the screw 26 and nut 28 are applied, causing the sleeves to exert pressure on the collars, whereby they are uniformly expanded laterally, shifting the article if required, by centering the holes exactly on the axes of the studs and thereafter clamping the article in its adjusted position.

From the foregoing it will be apparent that the work part is, in a measure, cushion supported, which principle is capable of use for other purposes than drilling; that the jig is subject to many forms for work part holding, and in which the thrust of a cutting tool is taken on one or more resilient supports.

Although the foregoing is descriptive of a simple embodiment of the invention, it is subject to such changes and modifications as may fall within the concept of the subjoined claims.

Having thus fully described the invention, what is claimed as new and desired to be secured by Letters Patent of the United States is:

1. In a device for holding a work-part in a predetermined position while performing operations thereon, said work-part being provided with two openings, a support adapted to receive the work-part, cylindrical posts fixed in said support to engage in the openings, a radially expansible collar on each post, a sleeve slidable on each post in contact with said collar, and means whereby the collar is dilated to fill each work-part opening, said means being also adapted to co-incidently clamp the work-part on said support.

2. A drill jig adapted to position a work part having at least two apertures extending therethrough in spaced parallel relation, said part to be drilled at a right angle at a predetermined distance from the centers of the apertures, said jig being composed of a base having raised side walls, studs fixed in said base to extend through the apertures free from contact therewith, an expansible sleeve on each stud, means to dilate said sleeves to fill the apertures, said means also being operative to clamp the work part when positioned by said sleeves, and drill guiding means fixed in said side walls accurately distanced from the axes of said studs.

FRANK WRIGHT.